(12) United States Patent
Shin et al.

(10) Patent No.: US 8,837,619 B2
(45) Date of Patent: Sep. 16, 2014

(54) METHOD AND APPARATUS FOR CONTROLLING DYNAMIC CHANNEL FEEDBACK IN A MIMO NETWORK

(75) Inventors: Won-Jae Shin, Yongin-si (KR); Young Jun Hong, Seoul (KR); Jong Bu Lim, Yongin-si (KR); Chang Yong Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 377 days.

(21) Appl. No.: 12/785,233

(22) Filed: May 21, 2010

(65) Prior Publication Data
US 2011/0103503 A1 May 5, 2011

(30) Foreign Application Priority Data
Nov. 2, 2009 (KR) .................. 10-2009-0104930

(51) Int. Cl.
*H04L 1/02* (2006.01)
*H04B 7/06* (2006.01)
*H04B 7/02* (2006.01)
*H04B 7/04* (2006.01)

(52) U.S. Cl.
CPC .............. *H04B 7/024* (2013.01); *H04B 7/0634* (2013.01); *H04B 7/0426* (2013.01); *H04B 7/0417* (2013.01)
USPC ...... 375/267; 375/295; 375/240.07; 370/329; 370/332; 370/252; 455/450; 455/69; 455/101

(58) Field of Classification Search
USPC ............. 375/267, 295, 240.07; 370/329, 332, 370/252; 455/450, 69, 101
See application file for complete search history.

(56) References Cited

U.S. PATENT DOCUMENTS

| 2008/0232503 | A1* | 9/2008 | Kim .............................. 375/267 |
| 2008/0317145 | A1* | 12/2008 | Clerckx et al. ................ 375/260 |
| 2009/0003474 | A1 | 1/2009 | Pan et al. |
| 2009/0128381 | A1* | 5/2009 | Choi et al. ..................... 341/106 |
| 2009/0201903 | A1* | 8/2009 | Ghady et al. ................... 370/342 |
| 2010/0027456 | A1* | 2/2010 | Onggosanusi et al. ....... 370/312 |

FOREIGN PATENT DOCUMENTS

| KR | 10-2007-0112421 | 11/2007 |
| KR | 10-2009-0014370 | 2/2009 |
| KR | 10-2009-0042140 | 4/2009 |
| KR | 10-2009-0064506 | 6/2009 |
| KR | 10-2009-0074825 | 7/2009 |
| KR | 10-2009-0080571 | 7/2009 |

OTHER PUBLICATIONS

Nahar Jindal, "MIMO Broadcast Channels with Finite Rate Feedback," *IEEE Transactions on Information Theory*, Nov. 2006, vol. 52, Issue 11, IEEE Information Theory Society, pp. 1-18.
ARIB-STD-T63-36.213 V8.5.0, Evolved Universal Terrestrial Radio Access (E-UTRA); Physical layer procedures (Release 8), Dec. 2008, 3rd Generation Partnership Project (3GPP).

* cited by examiner

*Primary Examiner* — Leila Malek
(74) *Attorney, Agent, or Firm* — NSIP Law

(57) ABSTRACT

A communication method and apparatus for coordinated multi-point (CoMP) transmission, is provided. Sizes of codebooks for a plurality of base stations may be adjusted based on a status of channels between a target terminal and a plurality of base stations. The terminal feeds back, to at least one of the plurality of base stations, channel direction information (CDI) including a number of bits of feedback.

24 Claims, 10 Drawing Sheets

FIG. 5
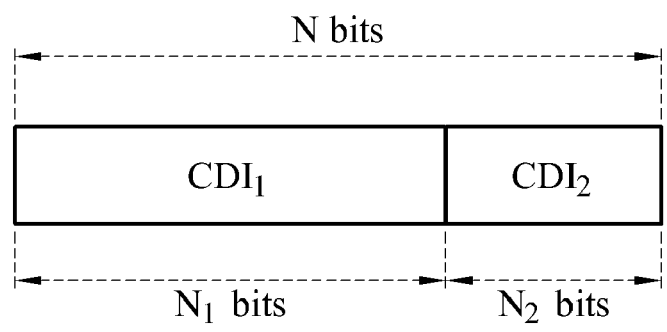
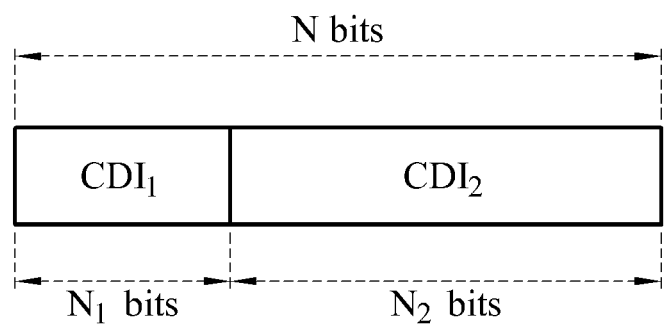

METHOD AND APPARATUS FOR CONTROLLING DYNAMIC CHANNEL FEEDBACK IN A MIMO NETWORK

CROSS-REFERENCE TO RELATED APPLICATION(S)

This application claims the benefit under 35 U.S.C. §119(a) of Korean Patent Application No. 10-2009-0104930, filed on Nov. 2, 2009, in the Korean Intellectual Property Office, the entire disclosure of which is incorporated herein by reference for all purposes.

BACKGROUND

1. Field

The following description relates to a multiple-input multiple-output (MIMO) technology, and more particularly, to a MIMO network in which a terminal feeds back information of channels between the terminal and a plurality of base stations that perform coordinated multi-point (CoMP) transmission.

2. Description of Related Art

Recently, studies on a communication system for providing a data service and a multimedia service have been conducted. For example, studies have been conducted on a communication system that uses frequency resources in a high-band to sufficiently obtain the frequency resources, and to decrease a cell coverage.

To compensate for the decrease of the cell coverage, there have been attempts to decrease the distance between cells. In these attempts, users in the edge of a cell may experience inter-cell interference from a plurality of adjacent cells. The inter-cell interference may decrease the transmission rate between users in the edge of the cell, and the inter-cell interference may also be a factor in preventing a guaranteed quality of service (QoS).

To overcome difficulties due to the inter-cell interference, various standards suggest a coordinated multi-point (CoMP) transmission technology. For example, in the CoMP transmission technology, all users may need to feed back channel information to at least one of a plurality of base stations. In this example, the communication system may only use limited channel feedback due to the size of the uplink overhead. The limited channel feedback, for example, the quantized error due to the limited channel feedback, may be a significant factor in decreasing the performance of the communication system. Therefore, it to is important to effectively use the limited channel feedback.

SUMMARY

In one general aspect, there is provided a communication method for coordinated multi-point (CoMP) transmission, the communication method including recognizing a status of channels that are between a target terminal and a plurality of base stations that perform the CoMP transmission, determining the sizes of a plurality codebooks for the plurality of base stations within a limited total size, based on the status of the channels, and constructing codebooks corresponding to the plurality of base stations based on the determined sizes.

The determining of the sizes may increase the size of a codebook for a base station corresponding to a channel having a high signal power, and may decrease the size of a codebook for a base station corresponding to a channel having a low signal power.

The communication method may further include constructing a joint codebook of the plurality of base stations based on the codebooks corresponding to the plurality of base stations.

The communication method may further include transmitting information about the constructed codebooks or information about the determined sizes of the codebooks.

The communication method may further include assigning channel information with respect to each of the channels to one of a physical uplink shared channel (PUSCH) and a physical uplink control channel (PUCCH), wherein the channel information is fed back from the target terminal.

The communication method may further include receiving channel information of each of the channels from the target terminal, and extracting codewords corresponding to the channel information from the codebooks corresponding to the plurality of base stations.

The communication method may further include designing beamforming vectors of the plurality of base stations based on the extracted codewords.

The communication method may further include transmitting information about the designed beamforming vectors to at least one of the plurality of base stations.

In another aspect, there is provided a communication method for CoMP transmission, the communication method including reporting, to at least one of the plurality of base stations, a status of channels between a target terminal and a plurality of base stations that perform the CoMP transmission, determining the sizes of a plurality of codebooks for the plurality of base stations within a limited total size, based on the status of the channels, and, when codebooks corresponding to the plurality of base stations are constructed based on the determined sizes, receiving information about the constructed codebooks and/or information about the determined size of the codebooks, and generating channel information of each of the channels using codebooks corresponding to the plurality of base stations.

The communication method may further include constructing a joint codebook of the plurality of base stations based on the codebooks corresponding to the plurality of base stations, wherein the generating of the channel information generates the channel information of each of the channels using the joint codebook.

The communication method may further include feeding back, to at least one of the plurality of base stations, the channel information of each of the channels using one of a PUSCH or a PUCCH.

In another aspect, there is provided a communication method for CoMP transmission, the communication method including estimating a status of channels between a target terminal and a plurality of base stations that perform CoMP transmission, determining the sizes of a plurality of codebooks for the plurality of base stations within a limited total size, based on the status of the channels, constructing codebooks corresponding to the plurality of base stations based on the determined sizes, and transmitting, to at least one of the plurality of base stations, information about the constructed codebooks and/or information about the determined sizes of the codebooks.

The communication method may further include generating channel information of each of the channels using the codebooks corresponding to the plurality of base stations.

The communication method may further include feeding back, to at least one of the plurality of base stations, the channel information of each of the plurality of channels using one of a PUSCH or a PUCCH.

The determining of the sizes may increase the size of a codebook for a base station corresponding to a channel having a high signal power, and may decrease the size of a codebook for a base station corresponding to a channel having a low signal power.

In another aspect, there is provided a computer-readable storage medium embodied with instructions for causing a processor to perform a method including recognizing a status of channels that are between a target terminal and a plurality of base stations that perform the CoMP transmission, determining the sizes of a plurality codebooks for the plurality of base stations within a limited total size, based on the status of the channels, and constructing codebooks corresponding to the plurality of base stations based on the determined sizes.

In another general aspect, there is provided a communication apparatus, including: a channel status recognizing unit configured to recognize a status of channels between a target terminal and a plurality of base stations that perform coordinated multi-point (CoMP) transmission, a size determining unit configured to determine a size of codebooks for the plurality of base stations within a limited total size, based on the status of the channels, a codebook constructing unit configured to construct codebooks corresponding to the plurality of base stations based on the determined sizes, a CDI receiving unit configured to receive channel direction information (CDI) of each of the channels from the target terminal, and a beamformer configured to: extract codewords corresponding to the CDI from codebooks corresponding to the plurality of base stations, and design beamforming vectors of the plurality of base stations based on the extracted codewords.

Information about the designed beamforming vectors may be transmitted to at least one of the plurality of base stations. The codebook constructing unit may be further configured to construct a joint codebook of the plurality of base stations based on the codebooks corresponding to the plurality of base stations. The CDI may be allocated to one of a physical uplink shared channel (PUSCH) and a physical uplink control channel (PUCCH).

In another general aspect, there is provided a communication apparatus, including: a channel status reporting unit configured to report a status of channels between a target terminal and a plurality of base stations that perform coordinated multi-point (CoMP) transmission, to at least one of the plurality of base stations, an information receiving unit configured to determine sizes of codebooks for the plurality of base stations within a limited total size, based on the status of the channels, a CDI generating unit configured to generate channel direction information (CDI) of each of the channels using codebooks corresponding to the plurality of base stations, and a feedback unit configured to feed back the CDI of each of the channels to at least one of the plurality of base stations.

The feedback unit may be further configured to feed back the CDI using one of a physical uplink shared channel (PUSCH) and a physical uplink control channel (PUCCH). When the codebooks corresponding to the plurality of base stations are constructed based on the determined sizes, the information receiving unit may be further configured to receive information about the constructed codebooks and/or information about the determined sizes of the codebooks.

Other features and aspects may be apparent from the following description, the drawings, and the claims.

BRIEF DESCRIPTION OF THE DRAWINGS

FIG. 5 is a diagram illustrating an example of adjusting a number of feedback bits.

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
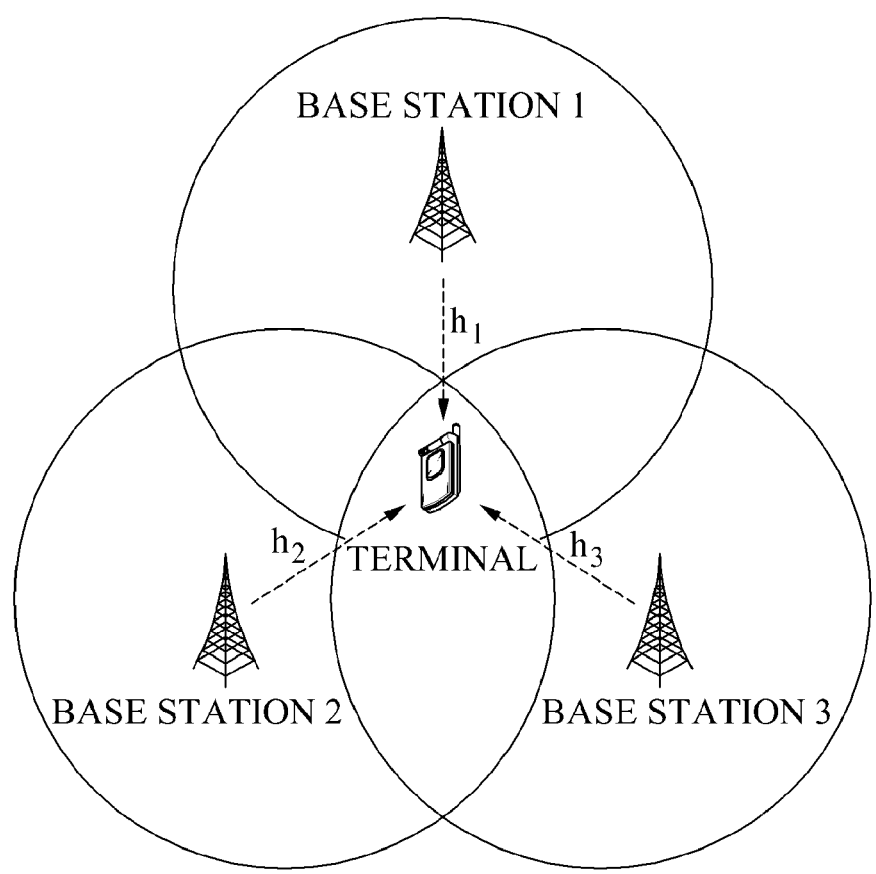
FIG. 1 is a diagram illustrating an example of a multi-cell communication system.

FIG. 1 illustrates an example of a multi-cell communication system. The multi-cell communication system includes a terminal and a plurality of base stations that perform a coordinated multi-point (CoMP) transmission.

Referring to FIG. 1, the multi-cell communication system includes base station 1, base station 2, base station 3, and the terminal. In this example, the circle located around each individual base station indicates the cell of that base station.

When the terminal is located in an edge of base stations 1, 2, and 3, an inter-cell interference may occur in the terminal. The base stations 1, 2, and 3 may use CoMP transmission to reduce the inter-cell interference. For example, the base stations 1, 2, and 3 may use beamforming vectors, thereby reducing the inter-cell interference occurring in the terminal. The status of channels $h_1$, $h_2$, and $h_3$, between the base stations 1, 2, and 3 and the terminal, may be determined. Accordingly, the base stations 1, 2, and 3 may design corresponding beamforming vectors based on the status of the channels. For example, base station 1 may design a beamforming vector based on the determined status of channel $h_1$.

Channel information with respect to the channels $h_1$, $h_2$, and $h_3$ between the base stations 1, 2, and 3 and the terminal may be fed back to the base station 1.

For example, the channel information may include channel direction information (CDI) and a channel quality information (CQI). The CDI may include, for example, information indicating a spatial direction of a channel, a preferred matrix indicator (PMI) which is information about a preferred codeword among a plurality of codewords included in a codebook, a PMI selected from a differential codebook, and the like.

The terminal may feed back the CDI to the base station 1 using a codebook including a plurality of codewords that quantize a predetermined space. In this example, the codebooks respectively used by the base stations 1, 2, and 3 may or may not be the same.

Figure 2:
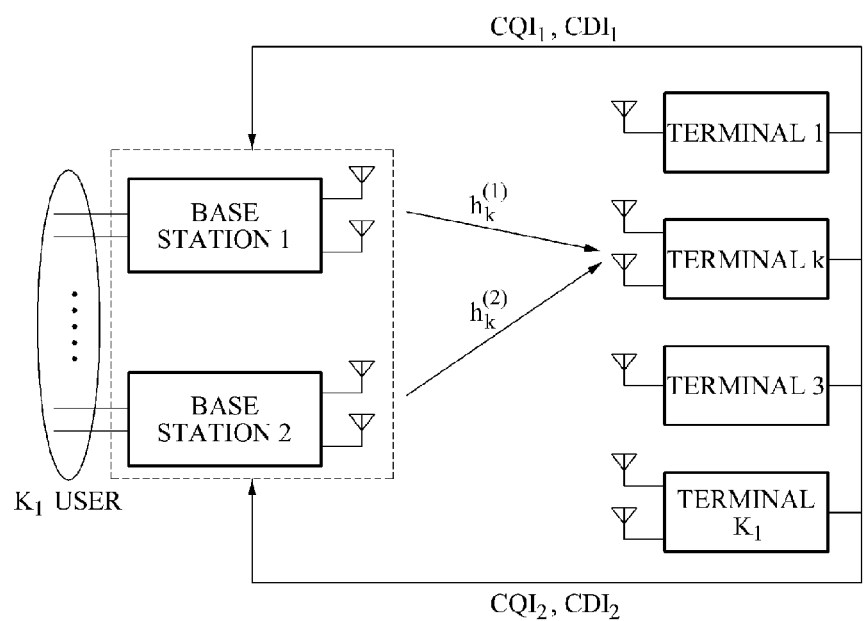
FIG. 2 is a diagram illustrating another example of a multi-cell communication system.

FIG. 2 illustrates another example of a multi-cell communication system. In this example, the multi-cell communication system includes a plurality of terminals and two base stations that perform CoMP transmission.

Referring to FIG. 2, base station 1 and a base station 2 serve $K_1$ terminals. For example, the $K_1$ terminals may be selected by a user selection algorithm such as a Greedy user selection algorithm.

In this example, base station 1 and the base station 2 use CoMP transmission, thereby reducing inter-cell interference occurring in terminals located at an edge of a cell. In other words, the base station 1 and the base station 2 may perform beamforming using beamforming vectors that are designed to reduce the inter-cell interference.

When the base station 1 designs beamforming vectors to be used by the base station 1 and the base station 2, the base station 1 may recognize channel information of channels between the terminal and the base stations. For example, the channel information may include CDI and CQI between each terminal and base station 1, and each terminal and base station 2. As an example, the terminal may feed back $CDI_1$ and $CQI_1$ with respect to a channel $h_k^{(1)}$ between the base station 1 and a terminal k, and $CDI_2$ and $CQI_2$ with respect to a channel $h_k^{(2)}$ between the base station 2 and the terminal k.

In some embodiments, the number of bits of the CDI 1 with respect to the channel $h_k^{(1)}$ and a number of bits of the CDI 2 with respect to the channel $h_k^{(2)}$ may be fixed or may vary. For example, the number of bits of the CDI 1 and the number of bits of the CDI 2 may be fixed to be the same. For example, when both the base station 1 and the base station 2 use a four-bit codebook including 16 codewords, the number of bits of the CDI1 and the number of bits of the CDI2 are both four bits, and a sum of the number of bits is "4+4=8".

However, the number of bits of the CDI1 and the number of bits of the CDI2 may not be the same and may not be fixed. For example, when the base station 1 wants to more accurately recognize the CDI1 with respect to the channel $h_k^{(1)}$ than the CDI2 with respect to the channel $h_k^{(2)}$, the number of bits for the CDI1 may be greater than the number of bits for the CDI2. For example, when a limited total number of bits is "8", the number of bits for the CDI1 may be "6" and the number of bits for the CDI2 may be "2".

The CDIs for each base stations may vary in importance. For example, the CDI for a base station corresponding to a channel having a relatively high signal-to-noise ratio (SNR) may have a relatively higher importance, and thus, the size of a codebook for the base station or the number of bits of the CDI may increase. Conversely, the CDI for a base station corresponding to a channel having a relatively low SNR may have a relatively lower importance, and thus, the size of a codebook for the base station or the number of bits of the CDI may decrease.

Accordingly, the number of bits dedicated for the CDI for the base stations may be adaptively adjusted, after evaluating importance of the CDI for the base stations that perform the CoMP transmission based on a status of channels. In some embodiments, the total sum of the number of bits of the CDI for each base station may be limited to a predetermined amount. Accordingly, even though a size of CDI for each of the base stations is adaptively changed, the total sum may be fixed or may be constant, and thus, no great different may occur in a format of feedback information.

Figure 3:
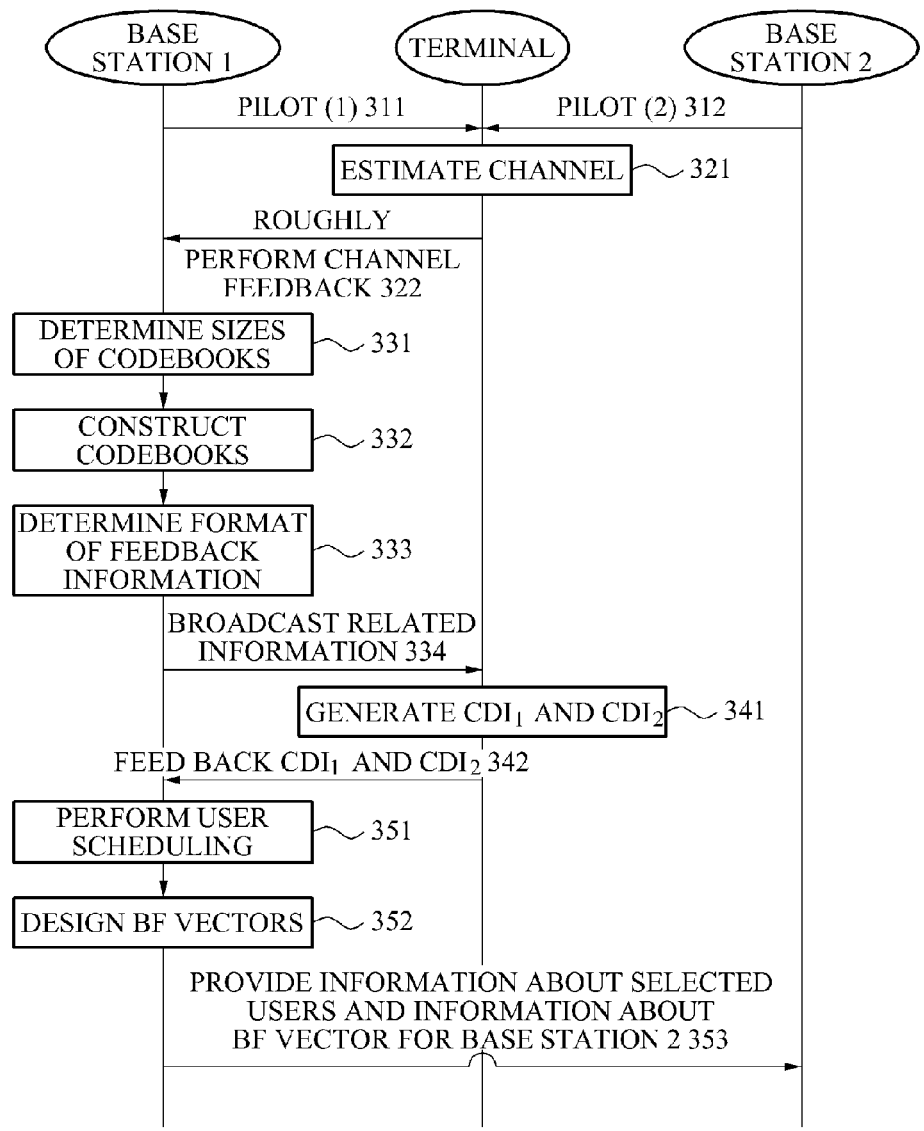
FIG. 3 is a diagram illustrating an example of a method of generating feedback between two base stations and a terminal.

FIG. 3 illustrates an example of a method of generating feedback between two base stations and a terminal.

Referring to FIG. 3, base station 1 and base station 2 respectively transmit cell specific pilots to a terminal. For example, base station 1 may transmit a pilot (1) to the terminal in operation 311 and base station 2 may transmit a pilot (2) to the terminal in operation 312. In this example, the pilot (1) is a cell-specific pilot of base station 1 and the pilot (2) is a cell-specific pilot of base station 2. In this example, base station 1 and base station 2 are base stations performing CoMP transmission with respect to the terminal, and the base station 1 is a serving base station of the terminal.

In operation 321, referring again to FIG. 2, the terminal estimates a channel $h_k^{(1)}$ between base station 1 and the terminal k and estimates a channel $h_k^{(2)}$ between base station 2 and the terminal k, based on the pilot (1) and the pilot (2), respectively. In operation 322, the terminal feeds back the estimated channel $h_k^{(1)}$ and channel $h_k^{(2)}$ to the base station 1.

In operation 331, base station 1 may recognize the channel $h_k^{(1)}$ and channel $h_k^{(2)}$, and may determine the size of a codebook for the base station 1 and the size of a codebook for the base station 2 based on a status of the channel $h_k^{(1)}$ and channel $h_k^{(2)}$, respectively. For example, the size of the codebook for the base station 1 may correspond to a number of bits of CDI for the base station 1, and the size of a codebook for the base station 2 may correspond to a number of bits of CDI for the base station 2. As an example, the size of the codebook for the base station 1 is $2^{N_1}$ codewords, and the number of bits of the CDI for the base station 1 is N1 bits.

In this example, the base station 1 may increase the size of a codebook for a base station corresponding to a channel having a high signal power, and may decrease a size of a codebook for a base station corresponding to a channel having a low signal power. For example, when an SNR of $h_k^{(1)}$/ and an SNR of $h_k^{(2)}$ increases, the size of the codebook for the base station 1 and the number of bits for the CDI1 may increase.

In operation 332, base station 1 constructs a codebook corresponding to the base station 1 and a codebook corresponding to a base station 2, based on the determined sizes of each respective codebook. The construction of the corresponding codebooks is described with reference to FIGS. 4 and 5.

Figure 4:
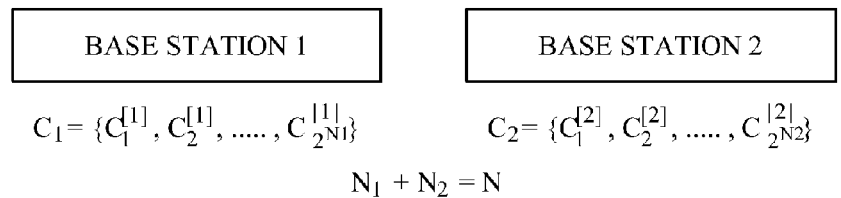
FIG. 4 is a diagram illustrating an example of a first codebook corresponding to a first base station and an example of a second codebook corresponding to a second base station.

FIG. 4 illustrates an example of a first codebook corresponding to a base station 1 and an example of a second codebook corresponding to a base station 2.

Referring to FIG. 4, when it is determined that a number of bits of CDI for the base station 1 is N1, and a number of bits of CDI for the base station 2 is N2, the codebook C1 for the base station 1 and the codebook C2 for the base station 2 may be expressed as shown in Equation 1.

$$C_1 = \{c_1^{[1]}, c_2^{[1]}, \ldots, c_{2^{N_1}}^{[1]}\}$$

$$C_2 = \{c_1^{[2]}, c_2^{[2]}, \ldots, c_{2^{N_2}}^{[2]}\} \quad \text{[Equation 1]}$$

In this example, it is determined that N1+N2=N, and a ratio of N2 to N1 may be determined based on a ratio of the SNR of the channel $h_k^{(2)}$ to the SNR of the channel $h_k^{(1)}$.

In this example, base station 1 may construct a joint codebook by combining the codebook C1 for the base station 1 and the codebook C2 for the base station 2. For example, an N-bit joint codebook C may be expressed as shown in Equation 2.

$$C = \frac{\left\{\begin{bmatrix} \|h_k^{(1)}\| \cdot c_1^{[1]} \\ \|h_k^{(2)}\| \cdot c_1^{[2]} \end{bmatrix}, \begin{bmatrix} \|h_k^{(1)}\| \cdot c_1^{[1]} \\ \|h_k^{(2)}\| \cdot c_2^{[2]} \end{bmatrix}, \cdots, \\ \begin{bmatrix} \|h_k^{(1)}\| \cdot c_1^{[1]} \\ \|h_k^{(2)}\| \cdot c_{2^{N_2}}^{[2]} \end{bmatrix}, \cdots, \begin{bmatrix} \|h_k^{(1)}\| \cdot c_{2^{N_1}}^{[1]} \\ \|h_k^{(2)}\| \cdot c_1^{[2]} \end{bmatrix}, \\ \begin{bmatrix} \|h_k^{(1)}\| \cdot c_{2^{N_1}}^{[1]} \\ \|h_k^{(2)}\| \cdot c_2^{[2]} \end{bmatrix}, \cdots, \begin{bmatrix} \|h_k^{(1)}\| \cdot c_{2^{N_1}}^{[1]} \\ \|h_k^{(2)}\| \cdot c_{2^{N_2}}^{[2]} \end{bmatrix} \end{bmatrix}\right\}}{\|h_k\|}$$

[Equation 2]

In this example, $\|h_k\|$ is an absolute value of $h_k$.

In some embodiments, operations 341 through 353 may be performed more frequently than operations 322 through 334. For example, operations 341 through 353 may be performed based on a short term period, whereas operations 322 through 334 may be performed based on a long term period.

FIG. 5 illustrates an example of adjusting a number of feedback bits. In this example, the number of feedback bits (N1) for CDI1 and the number of feedback bits (N2) for CDI 2 within a limited total number of feedback bits (N), are adjusted.

Referring to FIG. 5, the total number of feedback bits is limited to N bits, CDI1 for a base station 1 is indicated as N1 bits, and CDI2 for a base station 2 is indicated as N2 bits. N1 may increase based on a status of a channel $h_k^{(1)}$ and/or a channel $h_k^{(2)}$, whereas N2 may decrease based on a status of a channel $h_k^{(1)}$ and/or a channel $h_k^{(2)}$, or vice versa.

Referring again to FIG. 3, in operation 333, the base station 1 may determine a format of feedback information after the codebook C1 for the base station 1 and the codebook C2 for the base station 2 are constructed. The format of the feedback information is described with reference to FIG. 7.

In operation 334, base station 1 performs broadcasting, to the terminal, information about the constructed codebooks C1 and C2 and/or information about the sizes of the determined codebooks C1 and C2. Accordingly, the terminal may recognize the codebooks C1 and C2 that are constructed by base station 1 using the broadcasted information.

In operation 341, the terminal generates $CDI_1$ using the codebook C1 for the base station 1 and the channel $h_k^{(1)}$, and generates $CDI_2$ using the codebook C2 for the base station 2 and the channel $h_k^{(2)}$. For example, the $CDI_1$ may include information about an index of a codeword, from among codewords included in the codebook C1, that corresponds to the channel $h_k^{(1)}$. $CDI_2$ may include information about an index of a codeword, from among codewords included in the codebook C2, corresponding to the channel $h_k^{(2)}$.

When a joint codebook C is used, the $CDI_1$ and the $CDI_2$ may be unified as a single CDI.

When the joint codebook C is used, the CDI unifying the $CDI_1$ and the $CDI_2$ may be expressed as $$m_k = \arg_{1 \le l \le 2^N} \left| \hat{h}_k^H c_l \right|.$$

In this example, $$h_k = [h_k^{(1),H} \; h_k^{(2),H}]^H \text{ and } \hat{h}_k = h_k / \|h_k\|.$$

In operation 342, the terminal feeds back the $CDI_1$ and $CDI_2$ to the base station 1. In this example, although not illustrated in FIG. 3, the terminal may generate CGI with respect to the channel $h_k^{(1)}$ and channel $h_k^{(2)}$, namely, $CQI_1$ and $CQI_2$, and may feed back the generated $CQI_1$ and $CQI_2$.

In operation 351, the base station 1 performs user-scheduling based on the $CDI_1$, $CDI_2$, $CQI_1$, and $CQI_2$ that are fed back by the terminal. Various user selection algorithms may be applied, and users serviced by a plurality of base stations may be selected from among a plurality of users through the user-scheduling.

In operation 352, the base station 1 designs optimized beamforming vectors used by the base station 1 and the base station 2, based on $CDI_1$, $CDI_2$, $CQI_1$, and $CQI_2$ that are fed back by the terminal.

In operation 353, the base station 1 provides, to the base station 2, information about users selected through an X2 interface and the like and information about an optimized beamforming vector for the base station 2.

In this example, determining the size of codebooks and constructing the corresponding codebooks of the base stations may be performed by the base station 1, and may be performed by the terminal as illustrated in FIG. 4.

Figure 6:
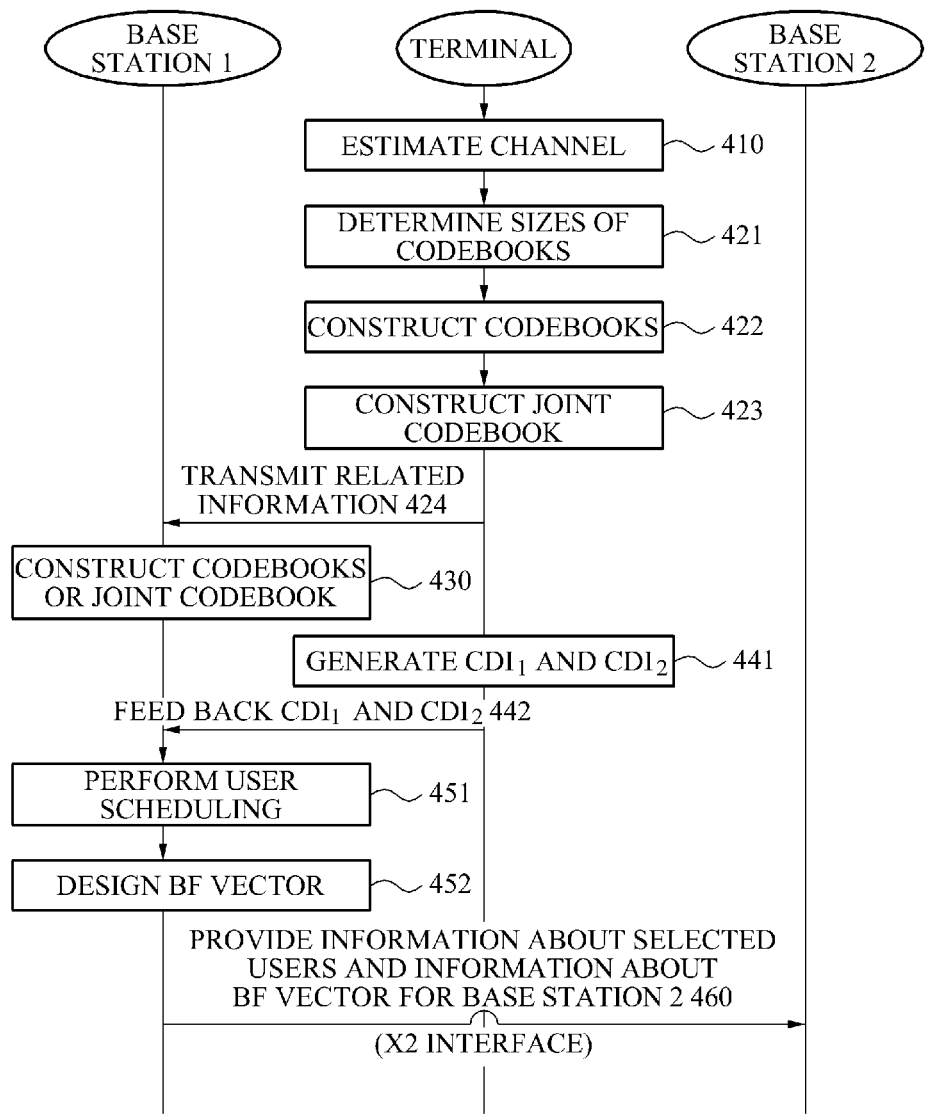
FIG. 6 is a diagram illustrating an example of base stations and a terminal generating codebooks.

FIG. 6 illustrates an example of base stations and a terminal generating codebooks.

Referring to FIG. 6, in operation 410, the terminal estimates a channel $h_k^{(1)}$ and a channel $h_k^{(2)}$ using pilots transmitted from a base station 1 and a base station 2.

In operation 421, the terminal determines a size of a codebook C1 for the base station 1 and a size of a codebook C2 for the base station 2, based on the channel $h_k^{(1)}$ and the channel $h_k^{(2)}$.

In operation 422, the terminal constructs the codebook C1 for the base station 1 and the codebook C2 for the base station 2 based on the determined sizes. In operation 423, the terminal selectively constructs a joint codebook C.

In operation 424, the terminal transmits, to the base station 1, information about the constructed codebooks C1 and C2 and/or information about the determined size of the codebooks C1 and C2.

In operation 430, the base station 1 constructs the codebook C1 for the base station 1 and the codebook C2 for the base station 2 based on the information about the codebooks C1 and C2 and/or based on the information about the sizes of the codebooks C1 and C2. In this example, the base station 1 may construct the joint codebook.

The terminal generates $CDI_1$ and $CDI_2$ in operation 441, and feeds back the generated $CDI_1$ and $CDI_2$ to the base station 1 in operation 442.

The base station 1 performs user-scheduling in operation 451, and designs beamforming vectors for the base station 1 and the base station 2 in operation 452. In operation 460, information about selected users and the information about the beamforming vector for the base station 2 may be provided to the base station 2 through an X2 interface.

In some embodiments, operations 410 through 430 may be operated based on a long term period.

Figure 7:
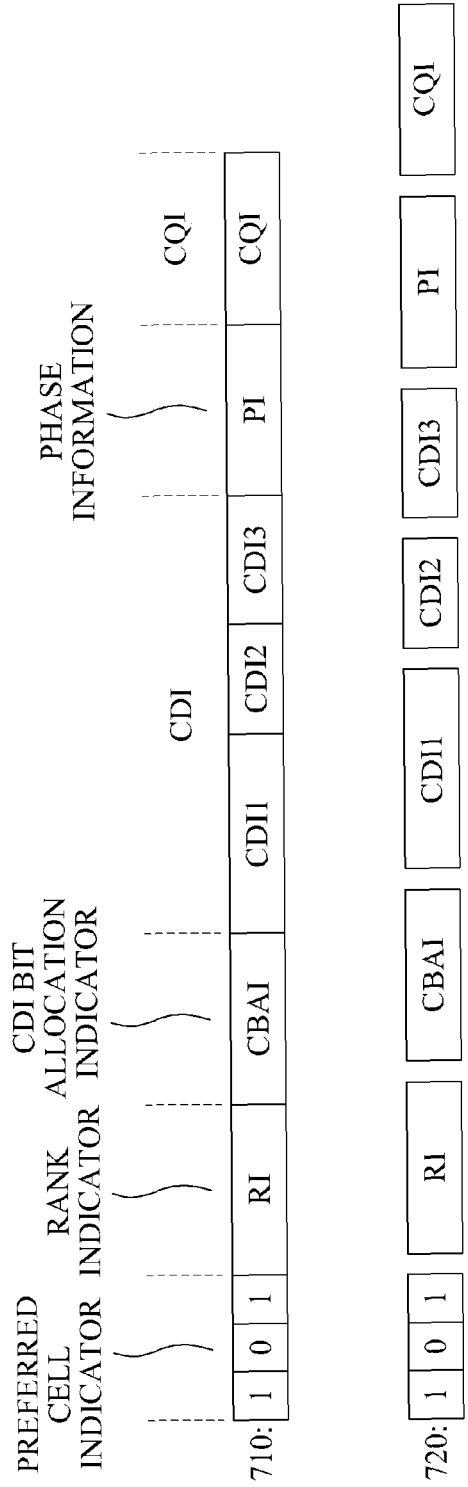
FIG. 7 is a diagram illustrating an example of feedback information.

FIG. 7 illustrates an example of feedback information. The feedback information may be fed back via a Physical Uplink Control Channel (PUCCH) and a Physical Uplink Shared Channel (PUSCH).

Referring to FIG. 7, feedback information 710 is fed back via the PUCCH, and feedback information 720 is fed back via the PUSCH.

In this example, the feedback information 710 fed back via the PUCCH includes a preferred cell indicator, a rank indicator, a CDI bit allocation indicator (CBAI), various CDI, phase information (PI), and CQI.

The preferred cell indicator may indicate whether the terminal prefers adjacent base stations as base stations that perform CoMP transmission. For example, the bit value "1" in the string of values "101" of the preferred cell indicator, may indicate a preferred base station, and the bit value "0" in the string of values "101" of the preferred cell indicator, may indicate a base station that is not preferred.

The rank indicator may indicate a rank that is preferred by the terminal. The rank corresponds to a number of data streams transmitted to the terminal from the base stations.

The CBAI may indicate bits where various CDIs are mapped. For example, the CBAI may indicate portions of the feedback information where CDI1, CDI2, and CDI3 are included.

The PI may indicate the difference between a phase of a channel between a predetermined base station such as the phase difference between a serving base station and a terminal. The PI may also indicate phases of channels between remaining base stations and the terminal.

The CQI may include channel quality information about channels between the base stations and the terminal.

The feedback information 720 fed back via the PUSCH may also include the preferred cell indicator, the rank indicator, the CBAI, the various CDI, the PI, and the CQI. In some embodiments, the feedback information 720 may be aperiodically transmitted to a base station from the terminal. Accordingly, when the feedback information 720 demands a great amount of resources, the PUSCH may be preferred.

The feedback information 710 fed back via the PUCCH and the feedback information 720 fed back via the PUSCH may be similar to each other, and each of the preferred cell indicator, the rank indicator, the CBAI, the various CDI, the PI, and the CQI may be occasionally fed back as the feedback information 720.

Figure 8:
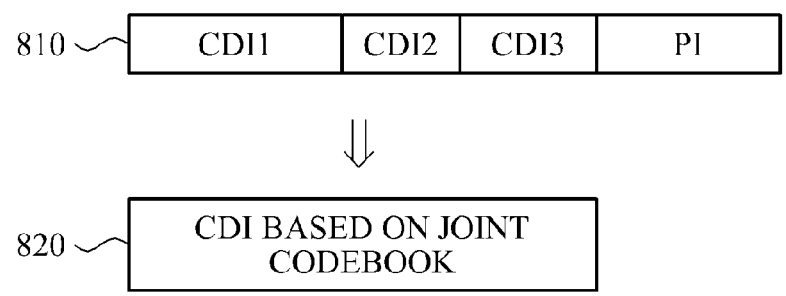
FIG. 8 is a diagram illustrating an example of channel direction information (CDI) included in feedback information.

FIG. 8 illustrates an example of channel direction information (CDI) included in feedback information. For example, the CDI may be included in the feedback information when a plurality of base stations use single-cell codebooks different from each other or when a plurality of base stations use a joint codebook.

Referring to the feedback information 810 shown in FIG. 8, if the plurality of base stations use different single-cell codebooks, a terminal may generate a CDI corresponding to each of the plurality of base stations and may feed back the generated CDI. For example, the terminal may generate CDI1 based on a single-cell codebook used by a base station 1, may generate CDI2 based on a single-cell codebook used by a base station 2, and may generate CDI3 based on a single-cell codebook used by a base station 3. A PI may be added to the plurality of CDIs, and the PI may include information about a phase difference between a plurality of channels. For example, the PI may include information about a difference between a phase of a channel between the base station 1 and the terminal and a phase of a channel between the base station 2 and the terminal.

Referring to the feedback information 820 of FIG. 8, if the plurality of base stations use the a same joint codebook, the terminal may generate a single CDI based on the joint codebook. As an example, when the plurality of base stations and the terminal have the joint codebook C, as given in Equation 2, the terminal may seek a single codeword from among codewords of the joint codebook C, and may feed back an index of the codeword as CDI. The CDI may be generated based on information about a phase difference between channels, and the terminal may not separately add PI to the CDI.

Figure 9:
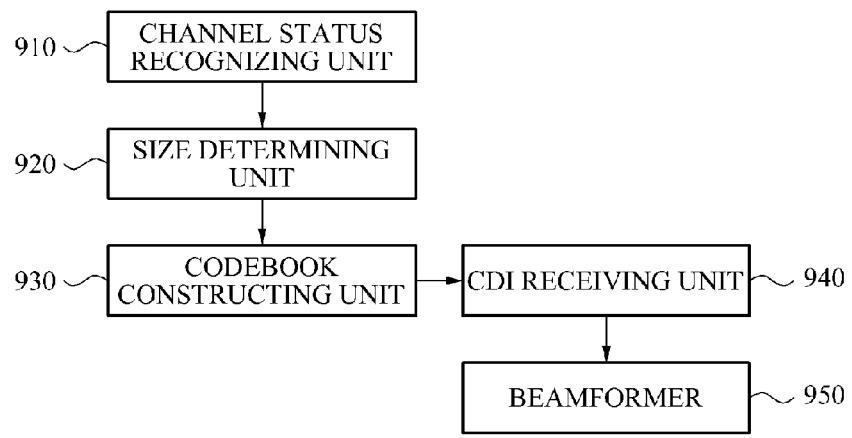
FIG. 9 is a diagram illustrating an example of a communication apparatus.
Figure 10:
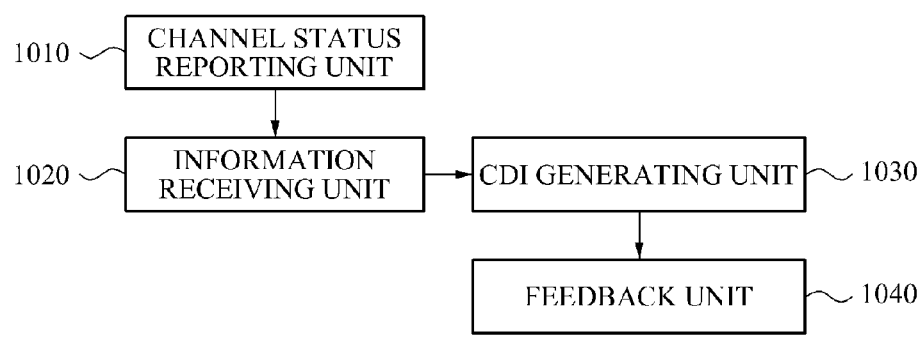
FIG. 10 is a diagram illustrating another example of a communication apparatus.

FIGS. 9 and 10 illustrate examples of communication apparatuses.

Referring to FIG. 9, the communication apparatus includes a channel status recognizing unit 910, a size determining unit 920, a codebook constructing unit 930, a CDI receiving unit 940, and a beamformer 950.

The channel status recognizing unit 910 may recognize a status of channels between a target terminal and a plurality of base stations that perform CoMP transmission.

The size determining unit 920 may determine the size of codebooks for the plurality of base stations within a limited total size, based on the status of the channels.

The codebook constructing unit 930 may construct codebooks corresponding to the plurality of base stations based on the determined sizes. In this example, the codebook constructing unit 930 may construct a joint codebook of the plurality of base stations based on the codebooks corresponding to the plurality of base stations.

The CDI receiving unit 940 may receive CDI of each of the channels from the target terminal. For example, the CDI may be allocated to one of a PUSCH and a PUCCH.

The beamformer 950 may extract codewords corresponding to the CDI from codebooks corresponding to the plurality of base stations, and may design beamforming vectors of the plurality of base stations based on the extracted codewords.

Information about the designed beamforming vectors may be transmitted to at least one of the plurality of base stations.

Referring to FIG. 10, the communication apparatus may include a status reporting unit 1010, information receiving unit 1020, a CDI generating unit 1030, and a feedback unit 1040.

The channel status reporting unit 1010 may report a status of channels between the target terminal and the plurality of base stations that perform CoMP transmission, to at least one of the plurality of base stations.

The information receiving unit 1020 may determine sizes of codebooks for the plurality of base stations within a limited total size, based on the status of the channels. In addition, when the codebooks corresponding to the plurality of base stations are constructed based on the determined sizes, the information receiving unit 1020 may receive information about the constructed codebooks and/or information about the determined sizes of the codebooks.

The CDI generating unit 1030 may generate CDI of each of the channels using codebooks corresponding to the plurality of base stations.

The feedback unit 1040 may feed back the CDI of each of the channels to at least one of the plurality of base stations, using one of the PUSCH and the PUCCH.

Accordingly, the example described herein may adaptively adjust the size of codebooks and a number of bits of feedback, wherein the codebooks may be used for feeding back the status of channels between a target terminal and a plurality of base stations that perform CoMP transmission.

The above-described example methods may be recorded in computer-readable storage media including program instructions to implement various operations embodied by a computer. The media may also include, alone or in combination with the program instructions, data files, data structures, and the like. Examples of computer-readable storage media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method for coordinated multi-point (CoMP) transmission, the communication method comprising:
   recognizing a status of channels that are between a target terminal and a plurality of base stations that perform the CoMP transmission;
   determining, by a processor, sizes of a plurality codebooks for the plurality of base stations within a limited total size, based on the status of the channels;
   constructing the plurality of codebooks corresponding to the plurality of base stations based on the determined sizes;
   adaptively adjusting a size of feedback information that the target terminal transmits to at least two base stations, from among the plurality of base stations, based on a change in the status of the channels between the target terminal and the plurality of base stations, wherein a total size of the feedback information transmitted to the plurality of base stations is the same before and after the adjusting; and
   transmitting, by the plurality of base stations, information about the determined sizes of the plurality of codebooks to the target terminal.

2. The communication method of claim 1, wherein the determining of the sizes increases the size of a codebook for a base station corresponding to a channel having a high signal power, and decreases the size of a codebook for a base station corresponding to a channel having a low signal power.

3. The communication method of claim 1, further comprising constructing a joint codebook of the plurality of base stations based on the codebooks corresponding to the plurality of base stations.

4. The communication method of claim 1, further comprising transmitting information about the constructed codebooks.

5. The communication method of claim 1, further comprising assigning channel information with respect to each of the channels to one of a physical uplink shared channel (PUSCH) and a physical uplink control channel (PUCCH), wherein the channel information is fed back from the target terminal.

6. The communication method of claim 1, further comprising:
   receiving channel information of each of the channels from the target terminal; and
   extracting codewords corresponding to the channel information from the codebooks corresponding to the plurality of base stations.

7. The communication method of claim 6, further comprising designing beamforming vectors of the plurality of base stations based on the extracted codewords.

8. The communication method of claim 7, further comprising transmitting information about the designed beamforming vectors to at least one of the plurality of base stations.

9. The communication method of claim 1, wherein the adaptively adjusting adjusts an amount of feedback bits used for the target terminal to transmit to a first base station and an amount of feedback bits for the target terminal to transmit to a second base station such that the total sum of feedback bits used for the first base station and the second base station remains the same.

10. A communication method for coordinated multi-point (CoMP) transmission, the communication method comprising:
    reporting, to at least one base station from among a plurality of base stations, a status of channels between a target terminal and the plurality of base stations that perform the CoMP transmission;
    receiving information about determined sizes of a plurality of codebooks corresponding to the plurality of base stations which are generated based on the status of the channels between the target terminal and the plurality of base stations;
    generating channel information of each of the channels using the plurality of codebooks corresponding to the plurality of base stations and feeding back the channel information to the at least one base station;
    adjusting a size of feedback information for the target terminal to transmit to at least two respective base stations, from among the plurality of base stations, based on a change in the status of the channels between the target terminal and the plurality of base stations, wherein a total size of the feedback information transmitted to the plurality of base stations is the same before and after the adjusting; and
    transmitting, by at least one of the target terminal and the plurality of base stations, information about determined sizes of the plurality of codebooks.

11. The communication method of claim 10, further comprising:
    constructing a joint codebook of the plurality of base stations based on the plurality of codebooks corresponding to the plurality of base stations,
    wherein the generating of the channel information generates the channel information of each of the channels using the joint codebook.

12. The communication method of claim 10, further comprising feeding back, to the at least one of the plurality of base stations, the channel information of each of the channels using one of a physical uplink shared channel (PUSCH) and a physical uplink control channel (PUCCH).

13. A communication method for coordinated multi-point (CoMP) transmission, the communication method comprising:
    estimating a status of channels between a target terminal and a plurality of base stations that perform the CoMP transmission;
    determining, by a processor, sizes of a plurality of codebooks for the plurality of base stations within a limited total size, based on the status of the channels;
    constructing the plurality of codebooks corresponding to the plurality of base stations based on the determined sizes;

transmitting, to at least one base station from among the plurality of base stations, information about the determined sizes of the plurality of codebooks; and adjusting a size of feedback information for the target terminal to transmit to at least two respective base stations, from among the plurality of base stations, based on a change in the status of the channels between the target terminal and the plurality of base stations, wherein a total size of the feedback information transmitted to the plurality of base stations is the same before and after the adjusting.

14. The communication method of claim 13, further comprising generating channel information of each of the channels using the codebooks corresponding to the plurality of base stations.

15. The communication method of claim 14, further comprising feeding back, to at least one of the plurality of base stations, the channel information of each of the plurality of channels using one of a physical uplink shared channel (PUSCH) and a physical uplink control channel (PUCCH).

16. The communication method of claim 13, wherein the determining of the sizes increases the size of a codebook for a base station corresponding to a channel having a high signal power, and decreases the size of a codebook for a base station corresponding to a channel having a low signal power.

17. A non-transitory computer-readable storage medium embodied with instructions for causing a processor to perform a communication method for coordinated multi-point (CoMP) transmission, the communication method comprising:

recognizing a status of channels that are between a target terminal and a plurality of base stations that perform coordinated multi-point (CoMP) transmission;

determining sizes of a plurality codebooks for the plurality of base stations within a limited total size, based on the status of the channels;

constructing the plurality of codebooks corresponding to the plurality of base stations based on the determined sizes;

adaptively adjusting a size of feedback information that the target terminal transmits to at least two respective base stations, from among the plurality of base stations, based on a change in the status of the channels between the target terminal and the plurality of base stations, wherein a total size of the feedback information transmitted to the plurality of base stations is the same before and after the adjusting; and transmitting, by the plurality of base stations, information about the determined sizes of the plurality of codebooks.

18. A communication apparatus, comprising:

a channel status recognizing unit configured to recognize a status of channels between a target terminal and a plurality of base stations that perform coordinated multi-point (CoMP) transmission based on feedback information;

a size determining unit configured to determine a size of a plurality of codebooks for the plurality of base stations within a limited total size, based on the status of the channels;

a codebook constructing unit configured to construct the plurality of codebooks corresponding to the plurality of base stations based on the determined sizes;

a CDI receiving unit configured to receive channel direction information (CDI) of each of the channels from the target terminal;

a beamformer configured to extract codewords corresponding to the CDI from codebooks corresponding to the plurality of base stations and design beamforming vectors of the plurality of base stations based on the extracted codewords; and a controller configured to adaptively adjust a size of a CDI that the target terminal transmits to at least two respective base stations, from among the plurality of base stations, based on a change in the status of the channels between the target terminal and the plurality of base stations, wherein a total size of the feedback information transmitted to the plurality of base stations is the same before and after the adjusting, wherein the communication apparatus transmits information about the determined sizes of the plurality of codebooks to the target terminal.

19. The communication apparatus of claim 18, wherein information about the designed beamforming vectors is transmitted to at least one of the plurality of base stations.

20. The communication apparatus of claim 18, wherein the codebook constructing unit is further configured to construct a joint codebook of the plurality of base stations based on the plurality of codebooks corresponding to the plurality of base stations.

21. The communication apparatus of claim 18, wherein the CDI is allocated to one of a physical uplink shared channel (PUSCH) and a physical uplink control channel (PUCCH).

22. A communication apparatus, comprising:

a channel status reporting unit configured to report a status of channels between a target terminal and a plurality of base stations that perform coordinated multi-point (CoMP) transmission, to at least one of the plurality of base stations;

an information receiving unit configured to determine sizes of a plurality of codebooks for the plurality of base stations within a limited total size, based on the status of the channels;

a CDI generating unit configured to generate channel direction information (CDI) of each of the channels using the plurality of codebooks corresponding to the plurality of base stations; and a feedback unit configured to feed back the CDI of each of the channels to at least one of the plurality of base stations, wherein the feedback unit is further configured to adjust a size of a CDI for the target terminal to transmit to at least two respective base stations, from among the plurality of base stations, based on a change in the status of the channels between the target terminal and the plurality of base stations, and a total size of the feedback information transmitted to the plurality of base stations is the same before and after the adjusting, and wherein, in response to the codebooks corresponding to the plurality of base stations being constructed based on the determined sizes, the information receiving unit is further configured to receive information about the determined sizes of the codebooks.

23. The communication apparatus of claim 22, wherein feedback unit is further configured to feed back the CDI using one of a physical uplink shared channel (PUSCH) and a physical uplink control channel (PUCCH).

24. The communication method of claim 1, wherein the determined size of a codebook for a respective base station, from among the plurality of base stations, corresponds to a number of channel direction information (CDI) bits used by the target terminal to feed back CDI information to the respective base station.

* * * * *